United States Patent
Sugiyama (10) Patent No.: US 8,638,378 B2
(45) Date of Patent: *Jan. 28, 2014

(54) PIXEL ARRAY AND IMAGE PROCESSING APPARATUS FOR IMAGE-CAPTURING

(75) Inventor: Toshinobu Sugiyama, Tokyo (JP)

(73) Assignee: Sony Corporation, Tokyo (JP)

(*) Notice: Subject to any disclaimer, the term of this patent is extended or adjusted under 35 U.S.C. 154(b) by 194 days.

This patent is subject to a terminal disclaimer.

(21) Appl. No.: 12/541,743

(22) Filed: Aug. 14, 2009

(65) Prior Publication Data

US 2009/0303553 A1 Dec. 10, 2009

Related U.S. Application Data

(63) Continuation of application No. 11/094,653, filed on Mar. 30, 2005, now Pat. No. 7,746,394.

(30) Foreign Application Priority Data

Apr. 2, 2004 (JP) ................ P2004-110008

(51) Int. Cl.
*H04N 3/14* (2006.01)
(52) U.S. Cl.
USPC ........... 348/272; 348/273; 348/275; 348/276; 348/277; 348/294
(58) Field of Classification Search
USPC ........ 348/266, 268, 269, 270, 271, 272, 273, 348/275, 276, 277, 278, 279, 281, 282, 283, 348/294, 300, 301, 302, 307, 308, 309, 310, 348/311
See application file for complete search history.

(56) References Cited

U.S. PATENT DOCUMENTS

| | | | | |
|---|---|---|---|---|
| 5,801,373 A | * | 9/1998 | Oozu et al. | 250/208.1 |
| 6,515,702 B1 | * | 2/2003 | Yadid-Pecht et al. | 348/308 |
| 7,274,393 B2 | * | 9/2007 | Acharya | 348/273 |
| 7,746,394 B2 | * | 6/2010 | Sugiyama | 348/272 |
| 2002/0140822 A1 | * | 10/2002 | Kahn et al. | 348/207.99 |
| 2002/0154225 A1 | * | 10/2002 | Matsumoto et al. | 348/229.1 |
| 2004/0125222 A1 | * | 7/2004 | Bradski et al. | 348/272 |
| 2005/0231618 A1 | | 10/2005 | Sugiyama | |

FOREIGN PATENT DOCUMENTS

| | | |
|---|---|---|
| JP | 2000-050287 A | 2/2000 |
| JP | 2001-069519 | 3/2001 |
| JP | 2001-251648 | 9/2001 |
| JP | 2002-247443 A | 8/2002 |

(Continued)

OTHER PUBLICATIONS

Japanese Office Action issued on Jan. 12, 2010 in connection with corresponding JP Application No. 2004-110008.

(Continued)

*Primary Examiner* — Lin Ye
*Assistant Examiner* — Peter Chon
(74) *Attorney, Agent, or Firm* — Dentons US LLP (57) ABSTRACT

An image-capturing apparatus includes a pixel array including pixels. Each of the pixels includes a transducer for generating signal charge according to the intensity of an incident light beam. The image-capturing apparatus further includes an output circuit for outputting a pixel signal outside the pixel array at a frame rate depending on the pixel position in the pixel array, based on the signal charge; and an output-controlling unit for controlling the operation of the output circuit.

10 Claims, 13 Drawing Sheets

(56) References Cited

FOREIGN PATENT DOCUMENTS

| JP | 2003-153291 A | 5/2003 |
|---|---|---|
| JP | 2003-169251 A | 6/2003 |
| JP | 2003-348459 A | 12/2003 |
| JP | 2005-086246 A | 3/2005 |
| JP | 2005-277513 A | 10/2005 |

OTHER PUBLICATIONS

Japanese Patent Office, Office Action issued in Japanese Patent Application 2004-110008, issued on Sep. 1, 2009.

* cited by examiner

-- Prior Art --

FIG. 10

-- Prior Art --

FIG. 11

-- Prior Art --

FIG. 12

-- Prior Art --

FIG. 13A

-- Prior Art --

FIG. 13B

BLINKING
OF LED

SAMPLING BY
SENSOR FRAME
OPERATION

-- Prior Art --

FIG. 14

-- Prior Art --

PIXEL ARRAY AND IMAGE PROCESSING APPARATUS FOR IMAGE-CAPTURING

RELATED APPLICATION DATA

The present application is a continuation of U.S. Ser. No. 11/094,653, filed Mar. 30, 2005, and claims priority to Japanese Application No. P2004-110008 filed Apr. 2, 2004, both of which applications are incorporated herein by reference to the extent permitted by law.

BACKGROUND OF THE INVENTION

The present invention relates to image-capturing apparatuses that capture natural images and that detect optical signals indicating various types of information.

Currently, image-capturing devices, for example, charge-coupled device (CCD) image sensors and complementary metal-oxide semiconductor (CMOS) image sensors, are available at low prices. Thus, many home electrical appliances and information technology (IT) apparatuses, for example, camcorders, digital still cameras, mobile phones, and personal computers, include cameras. Since CMOS image sensors and other general metal-oxide semiconductor (MOS) devices can be manufactured on a common production line, an image-sensing unit and other system units such as a signal-processing unit and an analog-to-digital converter (ADC) can be readily mounted on the same chip.

Moreover, an image sensor, disclosed in Japanese Unexamined Patent Application Publication No. 2003-169251, not only captures images, but also carries out other processes by analog and digital calculations.

Figure 9:
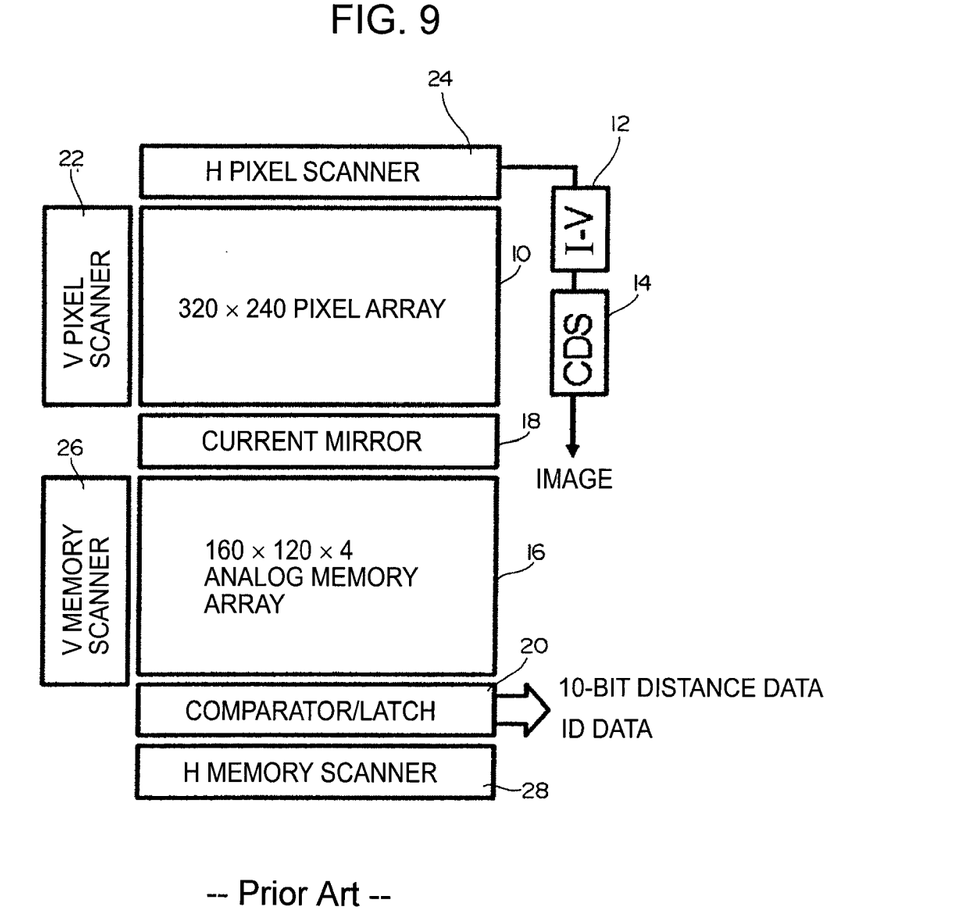
FIG. 9 is a block diagram illustrating the overall structure of a known image sensor.

This image sensor will now be described. FIG. 9 is a block diagram illustrating the structure of the CMOS image sensor. This image sensor can capture normal images that are referred to as natural images and three-dimensional range data of objects in images. The image sensor includes a pixel array 10 that has a two-dimensional array of pixels detecting light, a current-to-voltage (I-V) conversion circuit 12 that converts current signals detected by the pixel array 10 to voltage signals, a correlated double sampling (CDS) circuit 14 that filters out noise in image signals, an analog memory array 16 that holds the pixel signals detected by the pixel array 10, a current mirror 18 that outputs the pixel signals detected by the pixel array 10 to the analog memory array 16, a comparator-latch unit 20 that calculates the difference among values in memory cells in the analog memory array 16 and that latches the resulting difference value, a vertical (V) pixel scanner 22, a horizontal (H) pixel scanner 24, a vertical (V) memory scanner 26, and a horizontal (H) memory scanner 28. The V pixel scanner 22 and the H pixel scanner 24 control scanning of the pixel array 10. The V memory scanner 26 and the H memory scanner 28 control scanning of the analog memory array 16.

Figure 10:
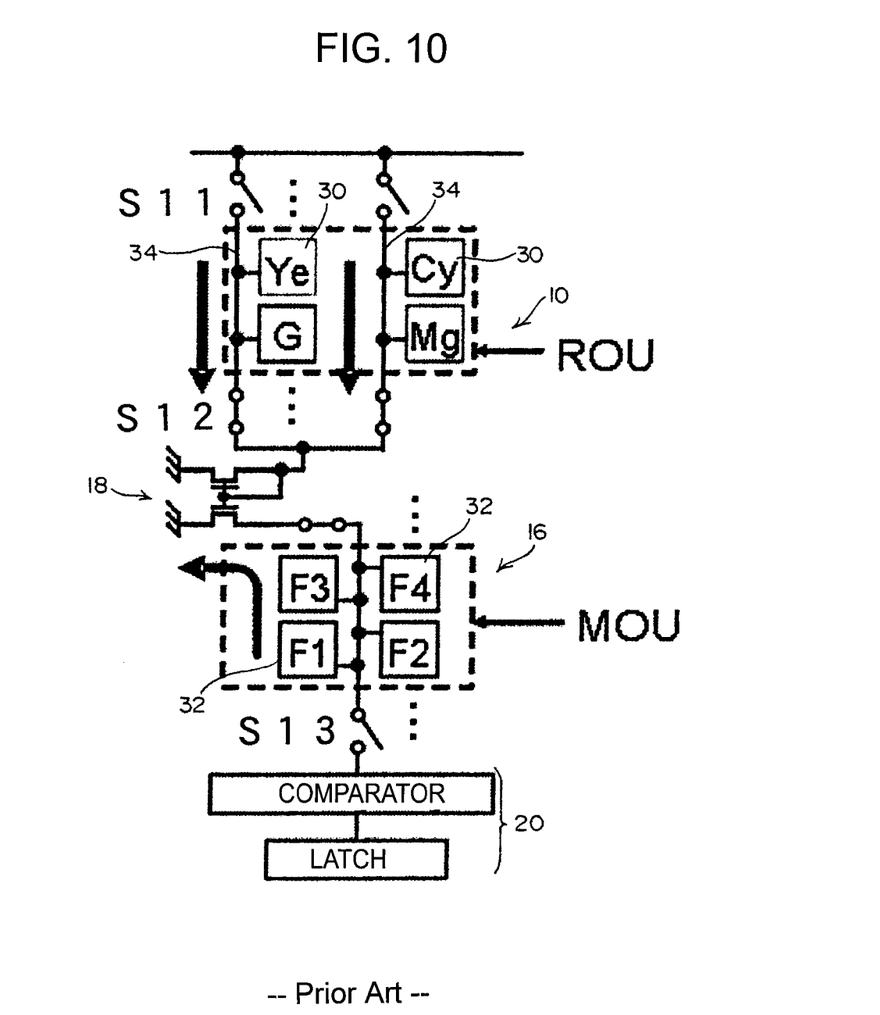
FIG. 10 is a block diagram illustrating the connection of circuits in the image sensor shown in FIG. 9.
Figure 11:
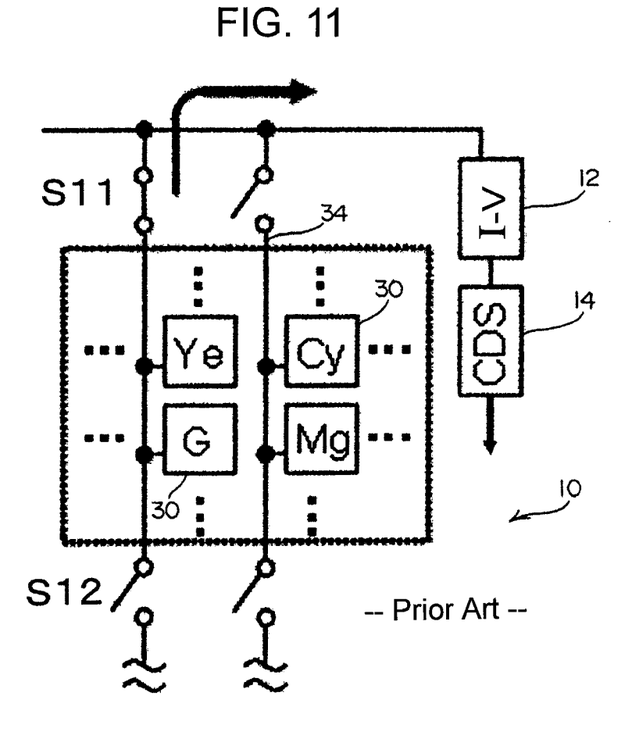
FIG. 11 is a block diagram illustrating an arrangement of color filters in the image sensor shown in FIG. 9.
Figure 12:
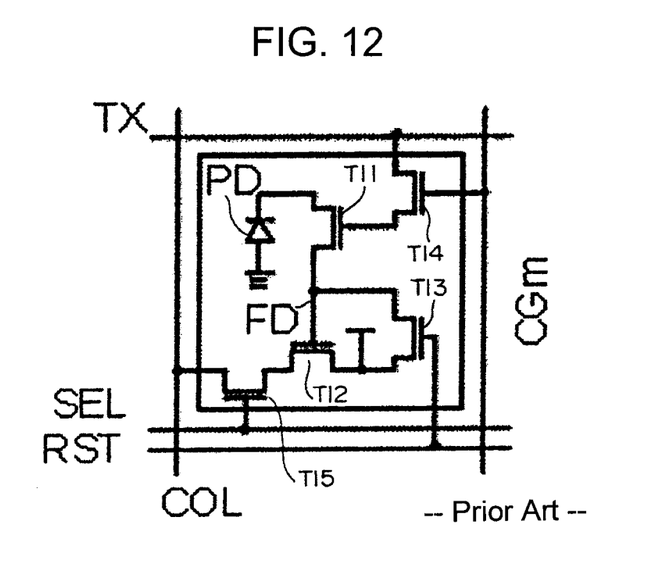
FIG. 12 is a circuit diagram of one pixel in the image sensor shown in FIG. 9.

FIG. 10 is a block diagram illustrating the connection of the circuits shown in FIG. 9. FIG. 11 is a block diagram illustrating switching operation in the pixel array 10 shown in FIG. 10. FIG. 12 is a circuit diagram of one pixel in the pixel array 10 shown in FIG. 9.

As shown in FIG. 10, the pixel array 10 includes four types of pixels 30, i.e., yellow (Ye), cyan (Cy), green (G), and magenta (Mg). The analog memory array 16 includes memory units F1 to F4 corresponding to four respective frames in high-speed frame scanning. Each of the memory units F1 to F4 includes memory cells 32. Signals from the pixels 30 are read through vertical signal lines 34 extending through the pixel array 10. Each vertical signal line 34 includes a switch S11 at the upper portion and a switch S12 at the lower portion. The switches S11 and S12 are turned on and off in response to a read operation of pixel signals. A switch S13 is provided between the analog memory array 16 and the comparator-latch unit 20 and is turned on and off in response to a read operation of memory signals.

As shown in FIG. 12, in this image sensor, five MOS transistors are provided for one pixel. Each pixel includes a photodiode PD serving as a photoelectric transducer, a floating diffusion part FD, a transfer transistor T11 that transfers signal charge generated at the photodiode PD to the floating diffusion part FD, an amplifying transistor T12 that outputs voltage signals or current signals based on the signal charge transferred to the floating diffusion part FD, a reset transistor T13 that resets the floating diffusion part FD to a power source potential based on reset signals (RST), a transfer-controlling transistor T14 that controls timing for switching the transferring transistor T11 based on column selection signals (CGm) and charge transfer signals (TX), and a selecting transistor T15 that controls timing for the amplifying transistor T12 to output signals based on pixel selection signals (SEL).

When normal image data is read out, signals from the pixels 30 are read out through the vertical signal lines 34 in the upward direction. The V pixel scanner 22 and the H pixel scanner 24 sequentially scan each row and each column to read out the signals from the pixels 30. Then, the signals from the pixels 30 are processed in the I-V conversion circuit 12 and the CDS circuit 14 and are amplified to be output outside the chip as analog image signals.

On the other hand, when three-dimensional range data is processed, signals from the pixels 30 are read out through the vertical signal lines 34 in the downward direction. In processing three-dimensional range data, frame scanning is carried out at a high rate of, for example, 14 kfps while a slit-shaped infrared light beam is emitted to an object and the reflected light is detected. Then, the difference among four consecutive frames is calculated.

As shown in FIG. 11, in a light-detecting section of the image sensor, color filters are provided on the pixels 30. RGBG primary-color filters or CMYG complementary-color filters are used. In this image sensor, since color filters need to transmit infrared light when three-dimensional range data is processed, CMYG complementary-color filters having high transmittance of near-infrared light are used. When three-dimensional range data is processed, four pixels corresponding to CMYG are read out as one range operating unit (ROU) to be combined in order to cancel differences in transmittance of near-infrared light in the CMYG filters. The analog memory array 16 includes the four memory units F1 to F4 for holding signals of four consecutive frames. In each of the memory units F1 to F4, the memory cells 32 are provided corresponding to respective ROUs in the pixel array 10. In this arrangement, the signals from the pixels 30 pass through the current mirror 18 and are temporarily held in the memory cells 32 for four consecutive frames. Then, the comparator-latch unit 20 calculates the difference between combined signals from two leading frames and combined signals from two succeeding frames and latches the resulting difference as binary data. When the ROUs detect the infrared light beam, the calculated difference is "1", and this data is output outside the image sensor.

In processing three-dimensional range data, the timing of detecting the infrared light beam can be used for measuring the distance between each pixel and the corresponding object.

Data communication can be carried out with signals obtained by encoding patterns (light intensity change) of a blinking light-emitting diode (LED), using the same image sensor as described above.

Figure 13A:
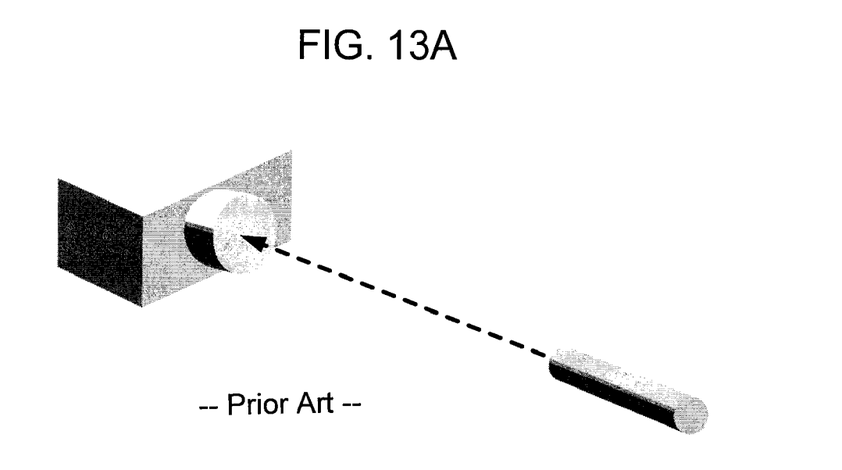
FIG. 13 illustrates a camera system for processing ID data, the camera system including the known image sensor.
Figure 13B:
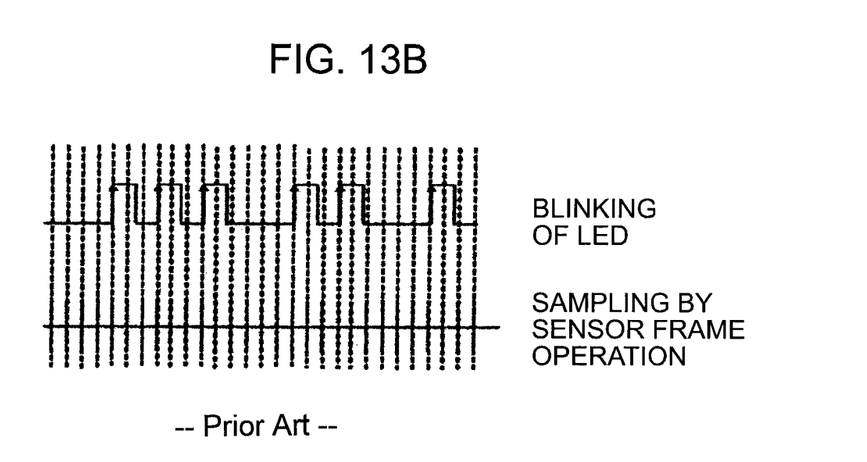

For example, as shown in FIG. 13, an LED light source (an LED beam controller) 2 blinks in the visual field of a camera 1, and ID data is generated by encoding patterns of blinking light. As in processing three-dimensional range data, the image sensor is controlled so as to calculate the difference among four consecutive frames. Each ROU detects timing of changes in the LED light, and outputs this data outside the image sensor. An external device derives the patterns of the blinking LED from this timing data. Thus, the external device can obtain data on IDs and pixels that detected the blinking LED light, and thus can identify objects in an image, superimpose the ID data, other data related to the ID data, and the objects on a display, and capture motions of the objects.

The known image sensor described above can capture image data, and can detect a slit-shaped infrared light beam for processing three-dimensional range data or can detect blinking LED light. However, since the same pixels detect light for these functions using common signals lines in the known image sensor, the operation of outputting image data and the operation of processing three-dimensional range data or of detecting blinking LED light cannot be simultaneously carried out.

Thus, in the known image sensor, the operation mode must change between an image-capturing mode and an optical-change-detecting mode every frame so that more than one type of data seem to be simultaneously output.

However, in the known image sensor, when image data is processed, image data is captured every other frame, and thus the usability of the image sensor is impaired. For example, in a system that is designed so as to use consecutive frames captured by a regular image sensor, the known image sensor may be installed instead of the regular image sensor so as to carry out a three-dimensional range data-processing function and an ID data communicating function in addition to an image-capturing function. In this case, there is no compatibility of image data between the known image sensor and the regular image sensor. Thus, the system needs to be rebuilt so that the system can control image data captured by the known image sensor.

Moreover, since every other frame is available in detecting blinking LED light, when ID data is retrieved from an LED provided in an object that moves quickly, the object may not be correctly tracked due to time lag.

SUMMARY OF THE INVENTION

An image-capturing apparatus according to the present invention includes a pixel array including pixels. Each of the pixels includes a transducer for generating signal charge according to the intensity of an incident light beam. The image-capturing apparatus further includes an output circuit for outputting a pixel signal outside the pixel array at a frame rate depending on the pixel position in the pixel array, based on the signal charge; and an output-controlling unit for controlling the operation of the output circuit.

An image-capturing apparatus according to the present invention includes a pixel array including pixels. Each of the pixels includes a transducer for generating signal charge according to the intensity of an incident light beam. The image-capturing apparatus further includes an output circuit for outputting a pixel signal outside the pixel array, based on the signal charge; an output-controlling unit for controlling the operation of the output circuit; and a signal-processing unit. The signal-processing unit includes signal-processing circuits. A predetermined signal-processing circuit depending on the pixel position in the pixel array processes the pixel signal.

DESCRIPTION OF THE PREFERRED EMBODIMENTS

In an image-capturing apparatus according to a first embodiment of the present invention, a pixel array in a CMOS image sensor includes pixels that capture normal images and pixels that are used for processing three-dimensional range data and ID data. These two types of pixels are separately provided. Signals are read out from the two types of pixels at respective frame rates and are processed in respective signal-processing circuits. Thus, capturing of normal images (natural images) and processing of three-dimensional range data and ID data can be simultaneously carried out.

Moreover, the operations described above are carried out in different signal-processing circuits at different frame rates, corresponding to color components of filters of pixels in one matrix. The pixels in the matrix have respective color filters, other than one pixel that has no color filter or has a color filter having no wavelength-selectivity. In this arrangement, the operations are carried out in different signal-processing circuits at different frame rates, corresponding to these two types of pixels.

Preferably, these pixels are controlled with respective control lines, and signals from the pixels are read out through respective signals lines.

Moreover, these types of pixels may be provided in different regions in the pixel array.

In this image-capturing apparatus, for example, first pixels that capture natural images and second pixels that detect infrared light may be separately provided, and different frame rates and signal-processing circuits may be used for these two types of pixels. Simultaneously, the first pixels may capture natural images and the second pixels may detect the reflected light of probe light in the light-section method, using different frame rates and signal-processing circuits. Simultaneously, the first pixels may capture natural images and the second pixels may detect optical signals generated by changing light intensity (blinking light), using different frame rates and signal-processing circuits. Moreover, the first pixels and the second pixels may simultaneously detect various types of optical signals generated by changing light intensity, using different frame rates and signal-processing circuits.

In this arrangement, natural images may be retrieved by reading out signals of columns of pixels in the array in parallel (referred to as a column-parallel mode) through a plurality of output signal lines, or by reading out signals of each pixel in the array one by one (referred to as a pixel-by-pixel mode).

Figure 1A:
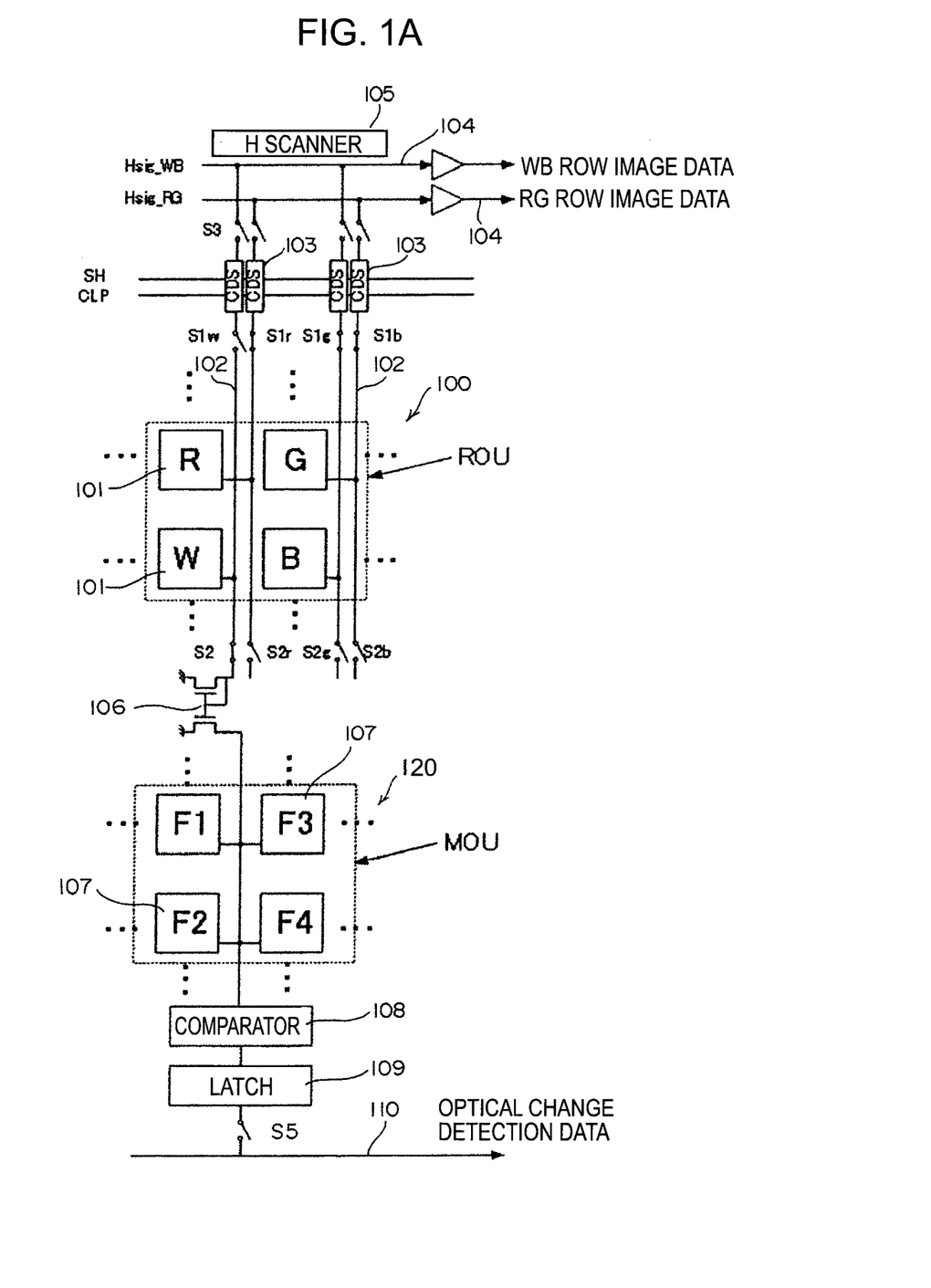
FIG. 1A is a block diagram illustrating the connection of circuits in an image sensor according to a first embodiment of the present invention.
Figure 2:
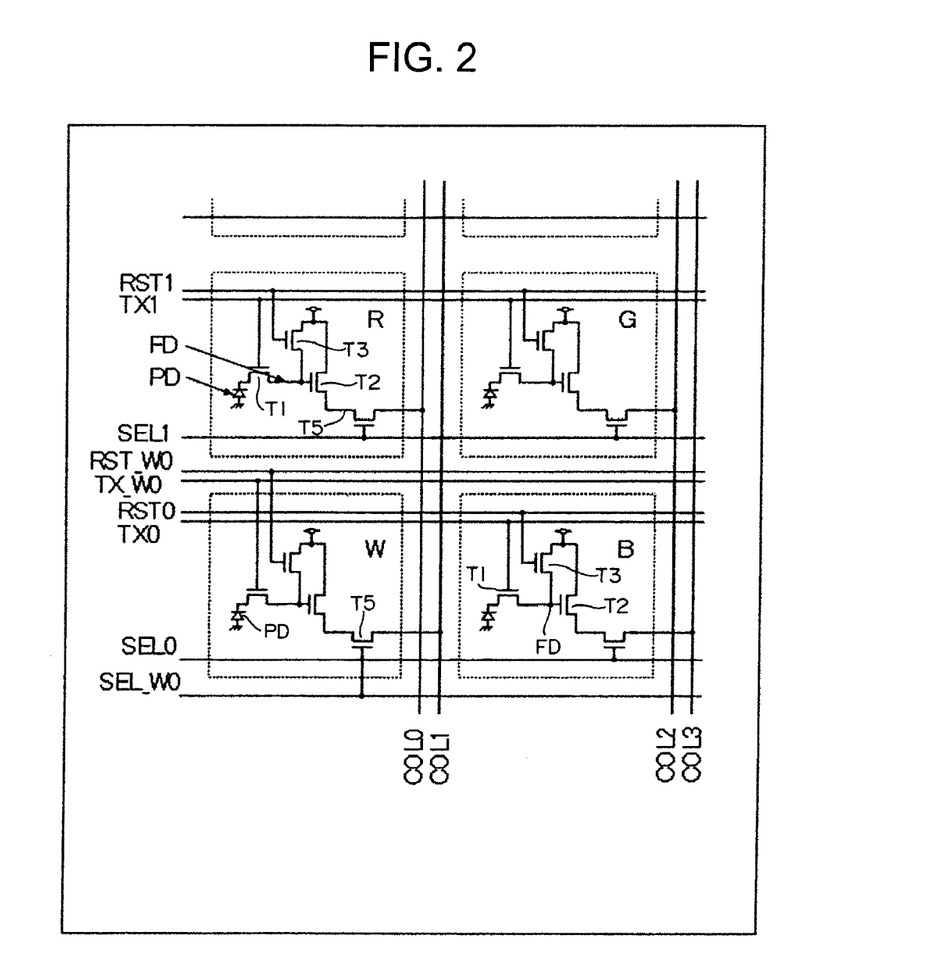
FIG. 2 is a circuit diagram of pixels in the image sensor shown in FIG. 1A.

FIG. 1A is a block diagram illustrating the connection of circuits in an image sensor according to a first embodiment of the present invention. FIG. 2 is a circuit diagram of pixels in the image sensor shown in FIG. 1A.

While image signals are processed for each pixel one by one in the known image sensor described with reference to FIGS. 9 to 12, in the first embodiment, a CDS circuit is provided for each column of pixels and cancels noise of image signals from the pixels to output the image signals through horizontal signals lines, as shown in FIG. 1A. The first embodiment will now be described.

The numbers of columns and rows of the pixel array and the analog memory array are the same as those in the known image sensor shown in FIG. 9. That is, one pixel array includes 320×240 pixels, and an analog memory array 120 includes four units of memory cells. Each unit includes 160× 120 memory cells for one frame.

Moreover, while CMYG complementary-color filters having a mosaic pattern are used in the known image sensor, RGB primary-color filters are used in this embodiment.

Figure 1B:
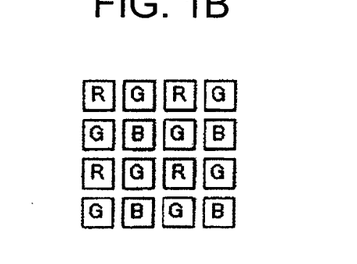
FIG. 1B illustrates the Bayer pattern.

In general, the Bayer pattern (RGBG) including 2×2 matrices is used in the primary-color filters, as shown FIG. 1B. Two elements in each 2×2 matrix correspond to green. On the contrary, in the first embodiment, one of these two elements corresponds to white (W). The white element has no filtering function, and all light components in the entire wavelength range thus pass through the white element. Pixels corresponding to white elements are used for detecting reflected light resulting from infrared light that is emitted when three-dimensional range data is processed, and are used for detecting blinking LED light when ID data is processed. In this embodiment, first pixels corresponding to red, green, and blue elements are used for capturing normal images, and second pixels corresponding to the white elements are used for detecting light intensity changes, as described above. That is, these two types of pixels have distinct functions and simultaneously output respective data.

The structure of this image sensor will now be described with reference to FIGS. 1A and 2. The overall structure of this image sensor is the same as that shown in FIG. 9.

As shown in FIG. 1, RGBW color filters having the Bayer pattern are provided for pixels 101 in a pixel array 100. Vertical signal lines 102 extend in the upward direction, parallel to rows of pixels, to connect to respective CDS circuits 103 through switches S1. The CDS circuits 103 connect to horizontal signal lines 104 and an H scanner 105.

On the other hand, the vertical signal lines 102 extend in the downward direction to a current mirror 106 through a switch S2. The output of the current mirror 106 connects to memory cells (F1 to F4) 107 for four frames. The memory cells 107 connect to a comparator 108 and a latch circuit 109. The output of the latch circuit 109 connects to a detection data output line 110 through a switch S5.

As shown in FIG. 2, in this image sensor, four MOS transistors are provided for each pixel. The following elements are provided for the pixel: a photodiode PD serving as a photoelectric transducer, a floating diffusion part FD, a transfer transistor T1 that transfers signal charge generated at the photodiode PD to the floating diffusion part FD based on charge transfer signals (TX), an amplifying transistor T2 that outputs voltage signals or current signals based on the signal charge transferred to the floating diffusion part FD, a reset transistor T3 that resets the floating diffusion part FD to a power source potential based on reset signals (RST), and a selecting transistor T5 that controls timing for the amplifying transistor T2 to output signals based on pixel selection signals (SEL).

In general CMOS image sensors, one vertical signal line (COL) is provided for each column of pixels, and one pixel-selecting line (SEL), one transfer line (TX), and one reset line (RST) are provided for each row of the pixels. In the first embodiment, in addition to these lines, pixel-selecting lines (SEL_W0), transfer lines (TX_W0), and reset lines (RST_W0) are exclusively provided for the second pixels. Moreover, vertical signal lines (COL0 to COL3) are exclusively provided for respective pixels corresponding to RGBW. Signals from columns of the pixels through these vertical signals lines are processed by CDS in the respective CDS circuits 103. Among these processed signals, WB row signals and RG row signals are transferred to respective horizontal signal lines (Hsig_WB and Hsig_RG) through switches.

The operation of this image sensor will now be described.

Figure 3:
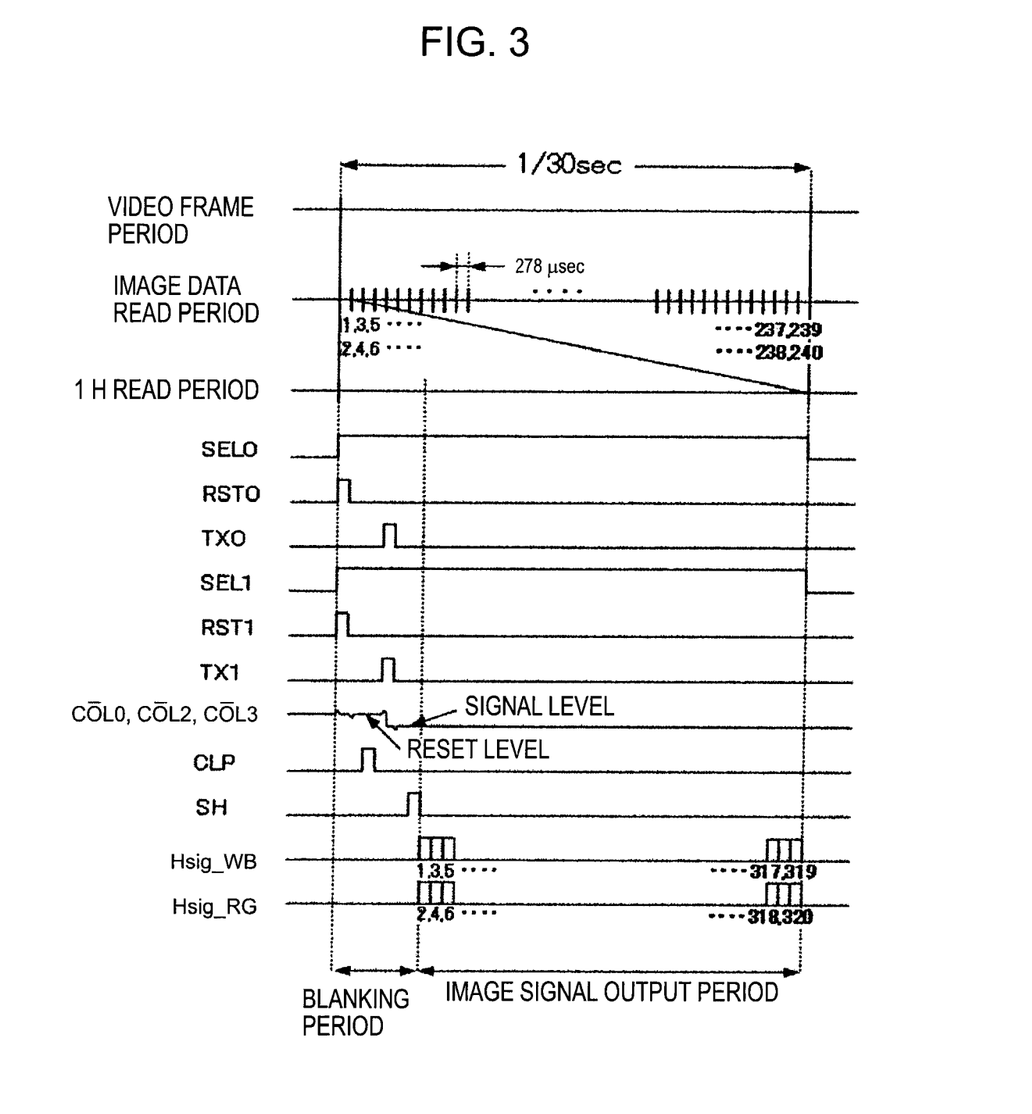
FIG. 3 is a timing chart illustrating the operation of reading out image data in the image sensor shown in FIG. 1A.
Figure 4:
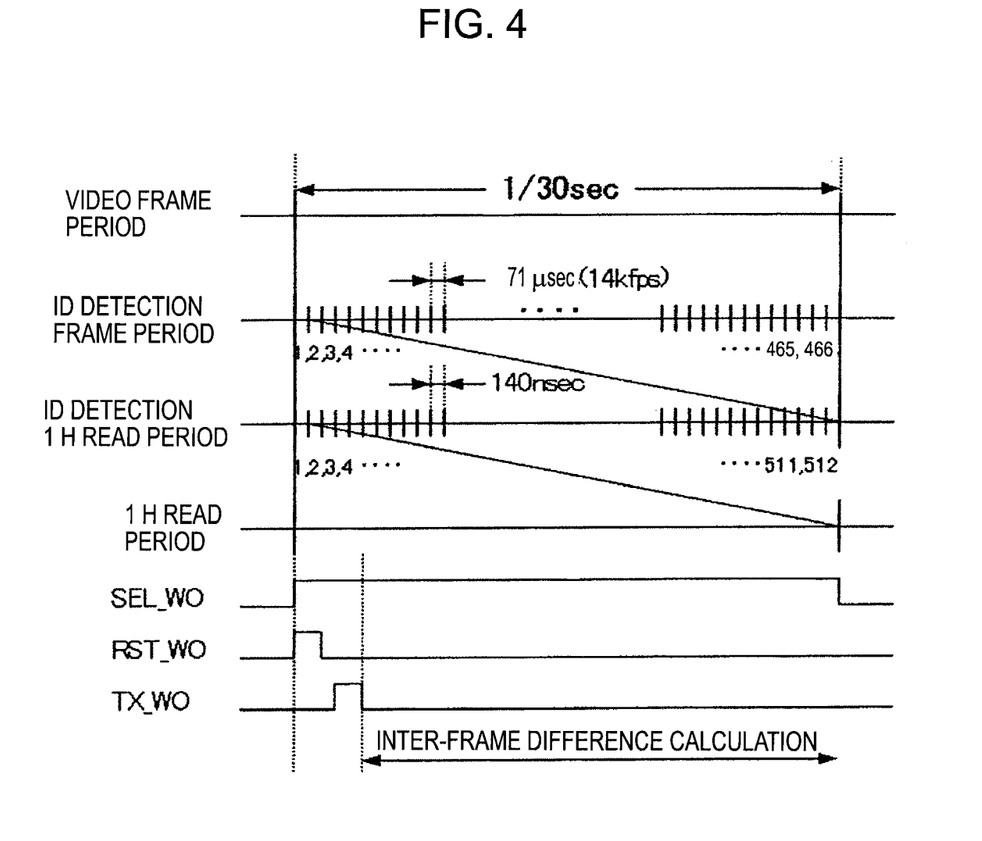
FIG. 4 is a timing chart illustrating the operation of processing three-dimensional range data and ID data in the image sensor shown in FIG. 1A.

FIGS. 3 and 4 are timing charts illustrating the operation of this image sensor. FIG. 3 illustrates the control of the first pixels, i.e., the operation of outputting normal images. FIG. 4 illustrates the control of the second pixels, i.e., the operation of processing three-dimensional range data and ID data. In FIGS. 3 and 4, the respective operations are carried out in the same video frame period (1/30 sec). In FIG. 3, though signals transmitted through the vertical signal lines (COL0, COL2, and COL3) are different from each other, these signals are shown by the same line. CLP and SH indicate clamp timing and sample-and-hold timing, respectively, in the CDS circuits 103.

As shown in FIG. 3, to read out from the first pixels, pixel-selecting lines (SEL0 and SEL1) are selected, and the floating diffusion part FD in each pixel is reset by applying pulses to reset lines (RST0 and RST1). Then, in each pixel, electric charge from the photodiode PD is transferred to the floating diffusion part FD based on charge transfer signals (TX0 and TX1), and signals corresponding to the electric charge are read out through the vertical signal lines (COL0, COL2, and COL3). As shown in FIG. 1, column by column, the respective CDS circuits 103 process these signals to remove noise from the signals, and the H scanner 105 then reads out the processed signals to the horizontal signal lines 104. In the first embodiment, the number of rows in a pixel array is 240, as in the image sensor shown in FIG. 9, and thus, the number of rows of RGBW matrices (ROU) is 120. In this arrangement, when the read time for one horizontal scanning (H) period (corresponding to one row of ROUs) is 278 μsec, one frame can be read out in ⅟30 sec. When signals are read out at a rate higher than 278 μsec, spare time in one video frame period can be used as a blanking period.

FIG. 4 illustrates the read operation of the second pixels. The rate of read operation of the second pixels is higher than that of the first pixels: Frames are read out at a rate of 71 μsec per frame in one video frame period of ⅟30 sec in the image sensor. This rate corresponds to 14 kfps. Thus, all rows of the second pixels are read out at a rate of 71 μsec, and the read time for one H period (corresponding to one row of ROUs) is 140 nsec. The read operation of the second pixels in one H period is the same as that of the first pixels. After the reset operation through the reset lines (RST_W0), signals are read out to the vertical signals lines (COL1) by the transfer operation through the transfer lines (TX_W0). As shown in FIG. 1, these read-out signals are transmitted in the downward direction through the current mirror 106 and the analog memory array 120 to be subjected to inter-frame differential calculation, as in the known image sensor.

As described above, the operation of reading out image signals from the first pixels shown in FIG. 3 and the operation of detecting light intensity changes through the second pixels in processing three-dimensional range data and ID data shown in FIG. 4 are simultaneously carried out at the same video frame period at different frame rates. Thus, two different types of data can be simultaneously retrieved.

In the operations described above, signals are read out from the first pixels only in the upward direction, and signals are read out from the second pixels only in the downward direction. In some operation modes, for example, when only image data is captured, the second pixels may also capture the image data to read out luminance signals at the same time when the first pixels capture the image data. Alternatively, current mirrors, analog memory arrays, and comparators may be provided for the first pixels and signal lines may extend in the downward direction from the first pixels to these circuits, or pixels in each ROU may share the same current mirror, the same analog memory array, and the same comparator, as in the known image sensor. In this arrangement, when only ID data is detected, the first pixels may also detect the ID data. To enable these alternative operations, the vertical signal lines (COL) include the switches S1 at the upper portion and the switches S2 at the lower portion to change the connection.

In the first embodiment, RGB primary-color filters are used. In a modification of the first embodiment, CMYG complementary-color filters may be used, as in the known image sensor.

Figure 5:
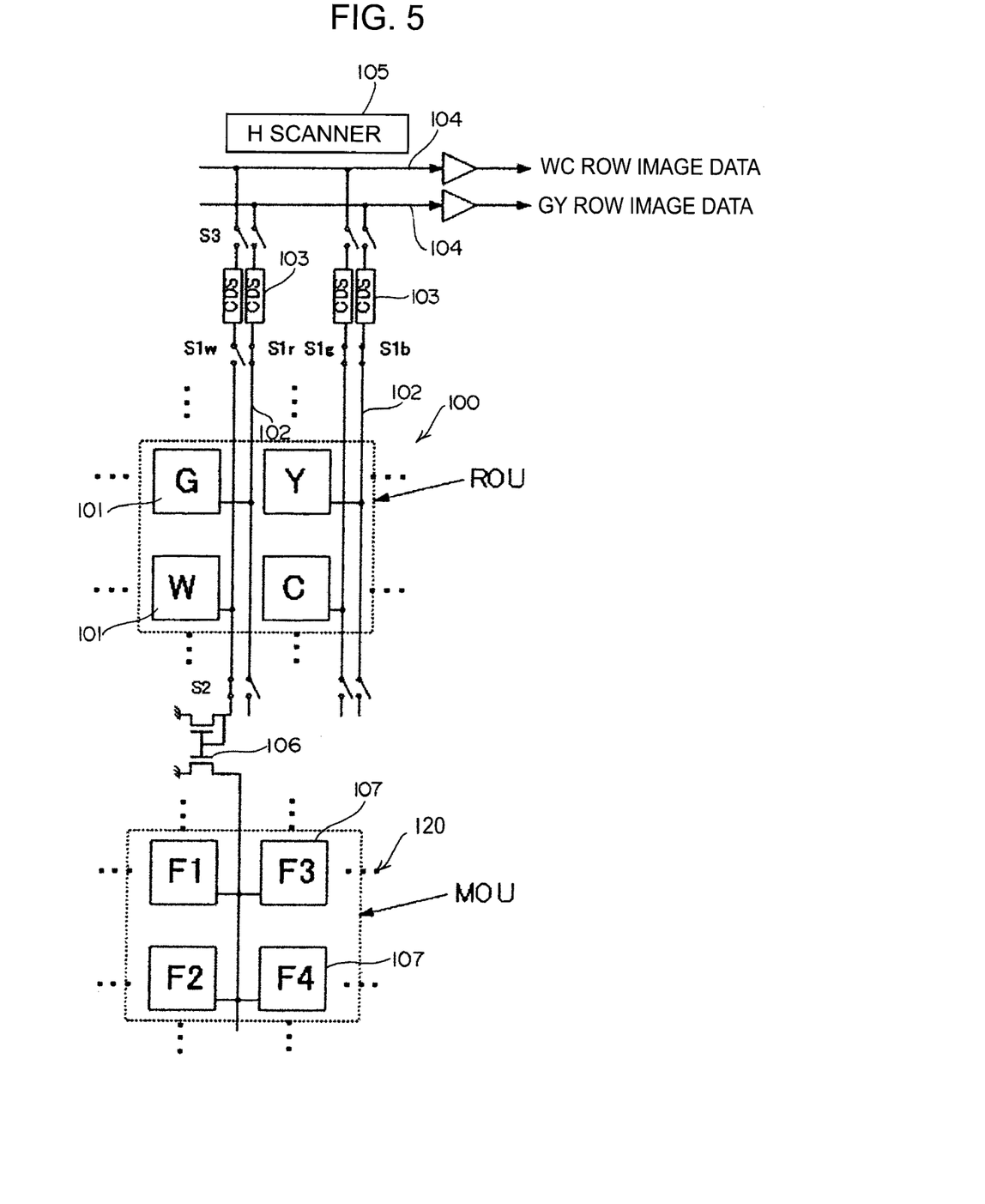
FIG. 5 is a block diagram illustrating the connection of circuits in a modification of the image sensor according to the first embodiment shown in FIG. 1A.

FIG. 5 is a block diagram illustrating the connection of circuits in the modification of the image sensor according to the first embodiment. FIG. 5 is different from FIG. 1 only in the arrangement of the color filters. In the image sensor shown in FIG. 5, M of CMYG is replace with W. Other components in FIG. 5 are the same as those in FIG. 1, and thus the description of these components is omitted.

Moreover, though image data are read out in a column-parallel mode in the first embodiment, the method of reading out image data is not limited to this mode because the operation of outputting image data and the operation of detecting ID data through the second pixels can be independently carried out. Thus, image data may be read out in a pixel-by-pixel mode as in the known image sensor. Alternatively, image data may be read out from pixels within a window of interest (WOI) using a special method of reading out image data to output the image data.

Figure 6:
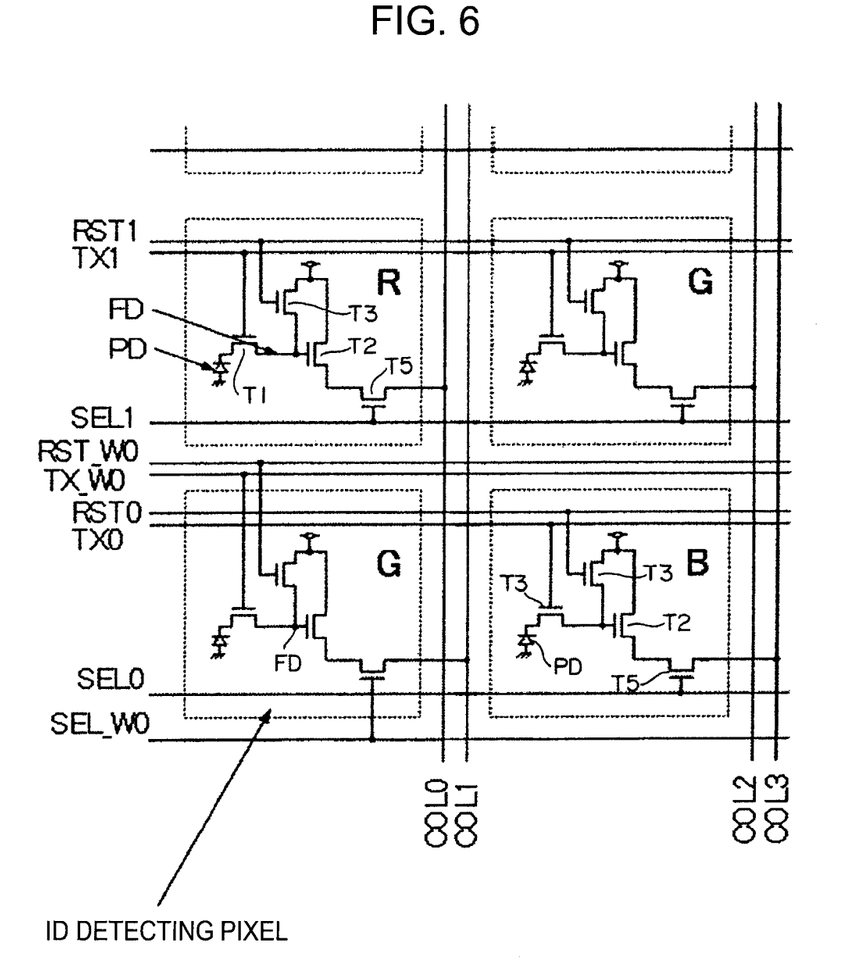
FIG. 6 illustrates an arrangement of color filters in a modification of the image sensor according to the first embodiment shown in FIG. 1A.

Furthermore, in the present invention, the W element having no filtering function need not be used, but regular RGBG filters in a matrix may be used, as shown in FIG. 6. In this modification of the first embodiment, for example, pixels corresponding to one of two G filters in the filter matrix are used for detecting ID data. However, since G filters transmit only green light, an LED that emits green light needs to be used for displaying ID data. Thus, the type of LED is limited. Moreover, pixels having other color filters than G filters may be used to detect ID data, or pixels having special filters that transmit only infrared light may be used.

Figure 7:
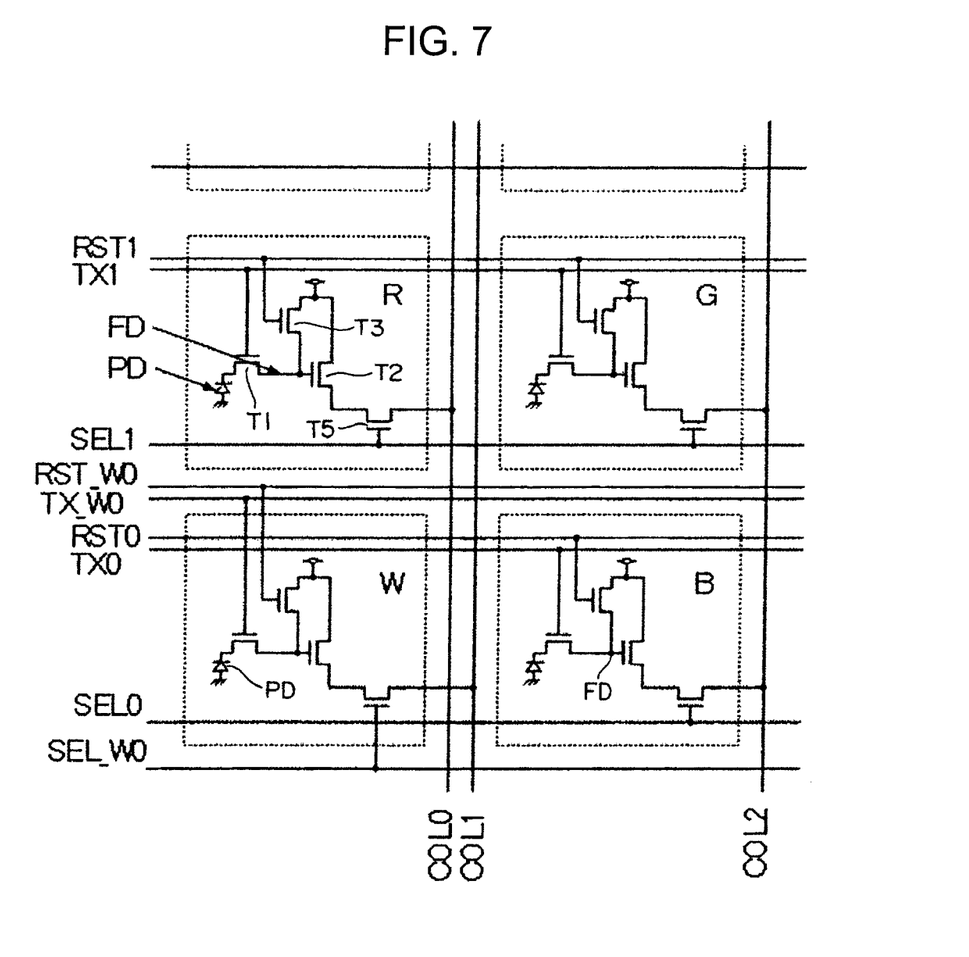
FIG. 7 illustrates an arrangement of color filters in another modification of the image sensor according to the first embodiment shown in FIG. 1A.

Furthermore, though the vertical signal lines (COL0 to COL3) are provided for respective pixels corresponding to RGBW in FIG. 2, one (COL3) of the vertical signal lines may not be provided, and a pixel having a G filter and a pixel having a B filter may share one vertical signal line (COL2), as shown in FIG. 7. In this modification of the first embodiment, WB rows and RG rows are not read out in parallel, but are alternately read out row by row. Thus, the horizontal signal lines 104 shown in FIG. 1 can be consolidated to one horizontal signal line that outputs WB row image data and RG row image data. However, the number of rows that need to be read for one frame period is twice that in the embodiment described above. Thus, when the frame rate is the same as that in the embodiment described above, a higher read rate is required.

Figure 8:
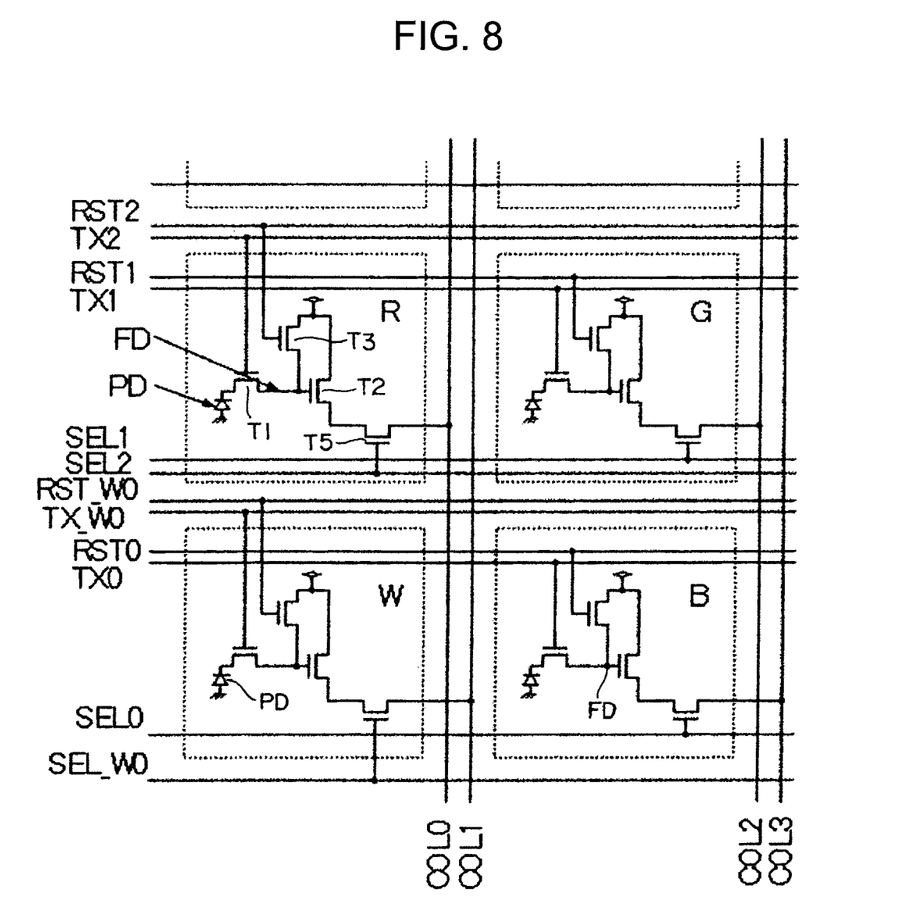
FIG. 8 illustrates the wiring of pixels in another modification of the image sensor according to the first embodiment shown in FIG. 1A.

Furthermore, as shown in FIG. 8, the signal lines (SEL, RST, TX, and COL) may be provided for each pixel of the 2×2 pixel matrix. In this modification of the first embodiment, any pixel in a pixel matrix may be set up so as to detect ID data. For example, one or more pixels in each matrix, or all pixels in matrices in a certain region in a pixel array may be set up so as to detect ID data. This configuration can be dynamically changed using the switches.

Figure 14:
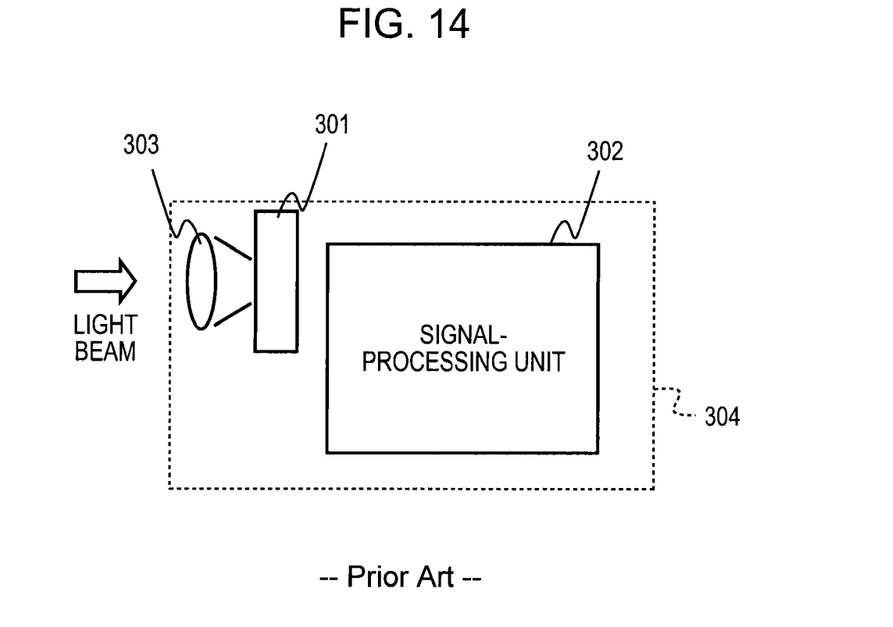
FIG. 14 is a schematic view illustrating a camera module according to another embodiment of the present invention.

Furthermore, the present invention is not limited to the image-capturing apparatus, which is formed on a single chip, but is also applicable to a camera module 304 including an imaging unit 301, a signal-processing unit 302, and an optical system 303, as shown in FIG. 14. The imaging unit 301 and the signal-processing unit 302 may be formed on different chips or the same chip.

What is claimed is:

1. An image-capturing apparatus comprising:
    a single pixel array comprising a plurality of pixel matrices, each pixel matrix having a plurality of pixels, each pixel having a respective position in said pixel matrix, each pixel comprising a transducer for generating a signal charge according to an intensity of an incident light beam;
    an output circuit for outputting, from each pixel, a respective pixel signal outside the pixel array based on the respective signal charge and at a respective frame rate, said respective frame rate depending on the respective position of each pixel in the pixel matrix of the single pixel array;
    an output-controlling unit for controlling the output circuit; and
    a signal-processing unit comprising a plurality of signal-processing circuits, said signal-processing unit configured to (1) select a predetermined one of said signal-processing circuits for processing each pixel signal and (2) process pixel signals at a plurality of different respective frame rates simultaneously during a single frame period.

2. The image-capturing apparatus according to claim 1, wherein:
    at least one pixel in each pixel matrix has a color filter, and a wavelength selectivity of said color filter corresponds to the respective position of the pixel in the pixel matrix.

3. The image-capturing apparatus according to claim 1, wherein:
 at least one pixel in each pixel matrix has a color filter,
 a wavelength selectivity of said color filter corresponds to the respective position of the pixel in the pixel matrix,
 each pixel is classified into a first type of pixel, said first type of pixel having at least one of a no color filter and a color filter without wavelength-selectivity, and a second type of pixel having a color filter, and
 each respective position in the pixel matrix corresponds to one of said first type and said second type.

4. The image-capturing apparatus according to claim 1, wherein each pixel is controlled through a control line corresponding to a predetermined signal-processing circuit.

5. The image-capturing apparatus according to claim 1, wherein the output circuit outputs the pixel signal through a signal line corresponding to a predetermined signal-processing circuit.

6. The image-capturing apparatus according to claim 1, wherein:
 each pixel is classified into a first type of pixel adapted for capturing natural images and a second type of pixel adapted for detecting an infrared light beam, and
 each respective position in the pixel matrix corresponds to one of said first type and said second type.

7. The image-capturing apparatus according to claim 1, wherein:
 each pixel is classified into a first type of pixel adapted for capturing natural images and a second type of pixel adapted for detecting the resulting reflected light beam from an emitted probe light beam in a light-section method, and
 each respective position in the pixel matrix corresponds to one of said first type and said second type.

8. The image-capturing apparatus according to claim 1, wherein:
 each pixel is classified into a first type of pixel adapted for capturing natural images and a second type of pixel adapted for detecting an optical signal generated by changing light intensity, and
 each respective position in the pixel matrix corresponds to one of said first type and said second type.

9. The image-capturing apparatus according to claim 1, wherein:
 a pixel matrix detects a plurality of types of optical signals generated by changing light intensity, and
 each respective position in the pixel matrix corresponds to one of said plurality of types.

10. The image-capturing apparatus according to claim 1, wherein:
 each signal-processing circuit is provided for one column of pixels; and
 said selection depends on the respective position of each pixel in the pixel matrix.

* * * * *